(12) United States Patent
Fair et al.

(10) Patent No.: US 12,305,139 B2
(45) Date of Patent: May 20, 2025

(54) SLIDING ELEMENT COMPRISING POLYMER OVERLAY

(71) Applicants: Mahle International GmbH, Stuttgart (DE); Mahle Engine Systems UK Ltd, Warwickshire (GB)

(72) Inventors: Jonathan Fair, Warwickshire (GB); Jennifer Harvey, Warwickshire (GB)

(73) Assignees: Mahle International GmbH (DE); MAHLE ENGINE SYSTEMS UK LTD (GB)

( * ) Notice: Subject to any disclaimer, the term of this patent is extended or adjusted under 35 U.S.C. 154(b) by 415 days.

(21) Appl. No.: 17/633,956

(22) PCT Filed: Aug. 4, 2020

(86) PCT No.: PCT/EP2020/071920
§ 371 (c)(1),
(2) Date: Feb. 8, 2022

(87) PCT Pub. No.: WO2021/028270
PCT Pub. Date: Feb. 18, 2021

(65) Prior Publication Data
US 2022/0298447 A1    Sep. 22, 2022

(30) Foreign Application Priority Data
Aug. 9, 2019 (GB) ..................... 1911428

(51) Int. Cl.
*C10M 169/04* (2006.01)
*C10M 107/44* (2006.01)
(Continued)

(52) U.S. Cl.
CPC ........ *C10M 169/04* (2013.01); *C10M 107/44* (2013.01); *C10M 125/04* (2013.01);
(Continued)

(58) Field of Classification Search
CPC .............. C10M 169/04; C10M 107/44; C10M 125/04; C10M 125/10; C10M 133/42;
(Continued)

(56) References Cited

U.S. PATENT DOCUMENTS

| 10,337,558 B2 | 7/2019 | Beaurepaire et al. |
| 2004/0224856 A1* | 11/2004 | Saiki ................... C09D 179/08 508/108 |

(Continued)

FOREIGN PATENT DOCUMENTS

| CN | 107763072 A | 3/2018 |
| CN | 109899396 A | 6/2019 |

(Continued)

OTHER PUBLICATIONS

GB Search Report for GB-1911428.9 mailed Jan. 9, 2020.
(Continued)

*Primary Examiner* — John D Freeman
(74) *Attorney, Agent, or Firm* — Fishman Stewart PLLC

(57) ABSTRACT

A bearing element may include an overlay layer which forms a bearing surface against a steel journal or the like. The overlay layer may be formed from a bearing material comprising a polymer matrix of polyamide-imide polymer material, melamine cyanurate particulate, and metal oxide particulate. A method of forming the bearing element comprising the bearing material are also provided.

18 Claims, 1 Drawing Sheet

(51) Int. Cl.
*C10M 125/04* (2006.01)
*C10M 125/10* (2006.01)
*C10M 133/42* (2006.01)
*C10M 141/06* (2006.01)
*C10M 171/06* (2006.01)
*F16C 17/02* (2006.01)
*F16C 33/04* (2006.01)
*F16C 33/12* (2006.01)
*F16C 33/20* (2006.01)
*C10N 40/02* (2006.01)
*C10N 50/08* (2006.01)

(52) U.S. Cl.
CPC ........ *C10M 125/10* (2013.01); *C10M 133/42* (2013.01); *C10M 141/06* (2013.01); *C10M 171/06* (2013.01); *F16C 17/022* (2013.01); *F16C 33/046* (2013.01); *F16C 33/124* (2013.01); *F16C 33/201* (2013.01); *F16C 33/206* (2013.01); *C10M 2201/05* (2013.01); *C10M 2201/062* (2013.01); *C10M 2215/30* (2013.01); *C10M 2217/0443* (2013.01); *C10N 2040/02* (2013.01); *C10N 2050/08* (2013.01); *F16C 33/208* (2013.01); *F16C 2223/42* (2013.01); *F16C 2240/48* (2013.01); *F16C 2240/60* (2013.01); *F16C 2360/22* (2013.01)

(58) Field of Classification Search
CPC .............. C10M 141/06; C10M 171/06; C10M 2201/05; C10M 2201/062; C10M 2215/30; C10M 2217/0443; F16C 17/022; F16C 33/046; F16C 33/201; F16C 33/206; F16C 2240/60; F16C 2360/22; F16C 2223/42; F16C 2240/48; F16C 33/208; F16C 9/02; F16C 9/04; F16C 33/124; F16C 33/203; F16C 2202/04; F16C 2208/42; C10N 2040/02; C10N 2050/08

See application file for complete search history.

(56) References Cited

U.S. PATENT DOCUMENTS

| | | | |
|---|---|---|---|
| 2017/0088792 A1* | 3/2017 | Kobayakawa | C08K 3/36 |
| 2017/0138396 A1 | 5/2017 | Latham et al. | |
| 2017/0350448 A1 | 12/2017 | Leonardelli | |
| 2018/0051749 A1* | 2/2018 | Beaurepaire | F16C 9/02 |
| 2018/0119740 A1 | 5/2018 | McEwan | |
| 2019/0101156 A1 | 4/2019 | Haneda | |
| 2019/0178290 A1 | 6/2019 | McEwan et al. | |
| 2020/0056039 A1 | 2/2020 | Reinicke | |

FOREIGN PATENT DOCUMENTS

| | | | |
|---|---|---|---|
| CN | 109983105 A | | 7/2019 |
| GB | 2544197 A | | 5/2017 |
| GB | 2552997 A | | 2/2018 |
| GB | 2555478 A | | 5/2018 |
| GB | 2569158 A | | 6/2019 |
| JP | 2004010707 A | | 1/2004 |
| JP | 2005170960 A | * | 6/2005 |
| WO | WO-04/113749 A1 | | 12/2004 |

OTHER PUBLICATIONS

Chinese First Office Action dated Jan. 15, 2024 and Chinese Search Report dated Jan. 11, 2024 for Chinese Patent Application No. 2020800563397.

* cited by examiner

SLIDING ELEMENT COMPRISING POLYMER OVERLAY

CROSS-REFERENCE TO RELATED APPLICATIONS

This application claims priority to International Patent Application No. PCT/EP2020/071920, filed on Aug. 4, 2020, and Great Britain Patent Application No. GB 1911428.9, filed on Aug. 9, 2019, the contents of both are hereby incorporated by reference in their entirety.

TECHNICAL FIELD

The invention relates to a bearing material, a bearing element, and a method of forming an overlay layer of bearing material on a substrate. In particular, the invention relates to an improved polymeric bearing material for use in an overlay forming a running surface or sliding surface of a plain bearing. Bearing materials and elements embodying the present invention are particularly suitable for use in automotive environments, including for supporting rotatable or slidable engine components and for use as, or as part of, other rotatable or sliding engine components. Such sliding engine components may include bearing lining shells, bushes, bearing surfaces of crankshafts, bearing surfaces of camshafts, bearing surfaces of connecting rods, thrust washers, bearing surfaces of a bearing block, bearing surfaces of a bearing cap, and piston assembly components such as piston rings, piston skirts, and cylinder walls and cylinder liners.

BACKGROUND

In internal combustion engines, the main-bearing assemblies typically each comprise a pair of half bearings retaining a crankshaft that is rotatable about an axis. Each half bearing is a generally semi-cylindrical bearing shell, and typically at least one is a flanged half bearing provided with a semi-annular thrust washer extending outwardly (radially) at each axial end, The bearing surfaces of bearing shells conventionally have a layered construction, in which a substrate comprising a strong backing material is coated with one or more layers having preferred tribological properties to provide a bearing surface that, in use, faces a cooperating moving part such as a crankshaft journal. In known bearing shells, the substrate comprises a backing coated with a lining layer, and the substrate is in turn coated with an overlay formed from a bearing material. The overlay is typically between about 6 and about 25 μm thick and may be formed of a plastic polymer-based composite layer or a metal-alloy layer (e.g. a tin-based alloy overlay).

The function of the overlay is to provide a relatively soft, conformable layer that can accommodate any small misalignments between the harder steel crankshaft journal and the bearing shells, and receive and embed dirt particles that may circulate in the oil supply and enter the bearing, so as to prevent damage to or scoring of the journal. These functions of the overlay are respectively termed conformability and embeddability.

Polymer-based bearing materials have become popular for use as overlays in recent years, and research into sliding components has resulted in a wide range of compositions of polymeric bearing materials.

With the advent of stop start engines and trends towards engine downsizing, engine bearings, in particular conrod and main bearings, are expected to perform under increasingly severe environments. The increased number of stop start cycles, in which oil films are depleted, means that the frictional, wear, and fatigue resistance properties of the bearing overlay and the overlay lifetime are key to bearing performance.

It is generally known that wear of the bearing material, or overlay, can lead to exposure of the lining layer to which the overlay material is applied. This can lead to failure of the sliding component due to seizure. Accordingly, there is a need for bearing materials to exhibit high wear resistance. In particular, it has also been found that bearings which are used in harsh or aggressive environments can be more likely to exhibit wear related failure, for example due to seizure. For example, sliding components used in diesel engines, for example in inline-four diesel engines with a capacity of between 1 and 2 litres, may be particularly susceptible to wear.

Furthermore, there is a need for bearing materials to exhibit high fatigue resistance. Fatigue is the process by which materials fail due to repeated loading and unloading at stresses below the ultimate strength of the material. Bearing surfaces and other sliding components need to be capable of being used for a high number of cycles without failure due to fatigue. High fatigue resistance is therefore desirable for bearing materials.

Accordingly, there is a need to provide a bearing material which exhibits both high wear resistance and high fatigue resistance, particularly for use in highly aggressive engine environments.

SUMMARY

According to a first aspect of the invention, there is provided a bearing material comprising, a polymer matrix of polyamide-imide polymer material, and melamine cyanurate particulate, metal oxide particulate, and at least 25 wt % metallic particulate dispersed in the polymer matrix. In other words, the melamine cyanurate particulate is dispersed in the polymer matrix, the metal oxide particulate is dispersed in the polymer matrix, and the metallic particulate is dispersed in the polymer matrix.

The provision of a polymer matrix of polyamide-imide (PAI) polymer material advantageously provides a robust and effective base for the bearing material.

In the aggressive conditions of modern internal-combustion engines, stop-start operation requires a typical engine to undergo a greatly increased number of stop-start operations. Each time an engine restarts, full hydrodynamic lubrication may not be in place and so bearings such as crankshaft bearings need to be able to survive an increased number of non-hydrodynamically-lubricated start-up operations. PAI-based bearing materials, with suitable filler materials, have demonstrated superior performance to other polymer materials under such conditions. The use of polyamide-imide polymer material in the bearing material of the present invention may thus advantageously provide a bearing material with good performance, including conformability and embeddability.

Starting from this polymer matrix, the inventors have identified that the provision of metal oxide particulate may be effective in increasing the wear resistance of the bearing material. This is particularly true where the metal oxide particulate has a high hardness.

The inventors have further identified that the provision of metallic particulate may increase the conformability, and the thermal conductivity of the bearing material. This may advantageously improve heat distribution throughout the polymer matrix. Moreover, the provision of metallic particulate may improve the fatigue resistance of the bearing material. However, it has been found that the provision of metallic particulate, particularly in high weight percentages, may reduce the wear resistance of the bearing material.

It is known to add metallic particulate to bearing materials in amounts up to about 25 wt %. However, adding metallic particulate in amounts higher than about 25 wt % has been found to result in an unacceptable reduction in the wear resistance of the bearing material. The inventors of the present invention, seeking to increase the fatigue resistance of the bearing material, have added a greater proportion of metallic particulate than is present in bearing materials of the prior art. This advantageously improves the fatigue resistance of the bearing material but would ordinarily lead to a reduction in the abrasive wear resistance. To counteract the reduced wear resistance associated with a high metallic particulate content, the inventors of the present invention have identified and included melamine cyanurate particulate in the polymer matrix. As set out in more detail below, melamine cyanurate particulate may improve the wear resistance of the bearing material by acting as a solid lubricant.

Bearing materials of the prior art have included solid lubricant. For example polytetrafluoroethylene (PTFE) is typically used as a solid lubricant in bearing materials. However, the inventors of the present invention have found that melamine cyanurate leads to superior fatigue and seizure resistance in the bearing material.

Melamine cyanurate, which may also be known as melamine-cyanuric acid adduct, melamine-cyanuric acid complex, or MCA, is commonly used as a flame or fire retardant. In the present invention the inventors have found that melamine cyanurate may be used as an effective solid lubricant in a PAI-based bearing material.

The inventors of the present invention have selected melamine cyanurate for use as a solid lubricant due to its hydrogen-bonding network and low coefficient of friction, in addition to its high thermal stability and low corrosively. These properties may make melamine cyanurate particularly advantageous for use as a solid lubricant in a PAI-based bearing material which may be subjected to high temperatures, particularly during use in a stop-start engine or under the aggressive conditions of a diesel engine.

The presence of melamine cyanurate particles may advantageously increase the load-carrying capacity of the bearing material thanks to the continuous breaking and reforming of the melamine cyanurate hydrogen-bonding network during use. This may advantageously increase the fatigue resistance and wear performance of the bearing material. In addition, the high thermal stability and low corrosivity of melamine cyanurate may advantageously increase the lifetime of a bearing element coated with the bearing material of the present invention, compared to the bearing materials known in the prior art.

The existence of a hydrogen-bonded network of molecular lamina in melamine cyanurate particles may allow shearing of adjacent layers on application of a lateral force. Melamine cyanurate may thus advantageously act as an effective solid lubricant in a bearing material that experiences lateral forces during running of a bearing.

The melamine cyanurate may act as a solid lubricant in an overlay formed from bearing material by lowering the coefficient of friction of the cured bearing material. The incorporation of melamine cyanurate solid lubricant in the bearing material may thus improve running-in behaviour, torque-to-turn tests and bearing lifetimes. By improving the coefficient of friction of the bearings in an engine, use of melamine cyanurate solid lubricant may further aid in improving engine efficiency and reducing emissions.

The bearing material may comprise a solid lubricant comprising melamine cyanurate, or consisting of melamine cyanurate.

In a preferred embodiment, the bearing material comprises melamine cyanurate as the only solid lubricant material, such that the bearing material does not contain other solid lubricants such as graphite, $MoS_2$, or PTFE.

A PAI-based bearing material comprising melamine cyanurate as a solid lubricant may advantageously achieve desirable physical properties. Preferably, such a bearing material may demonstrate similar, or better, physical properties than known PAI-based bearing materials. For example, the bearing material of the present invention may demonstrate increased load carrying capacity. The bearing material may also exhibit improved fatigue resistance, due to the hydrogen-bonding network of the melamine cyanurate, and an enhanced lifetime thanks to the thermal stability and low corrosivity of the melamine cyanurate.

Melamine cyanurate advantageously exhibits good shear resistance characteristics, which may be attributable to the shearing and reforming of hydrogen bonds in the melamine cyanurate. This may enable the bearing material of the present invention to provide a high load carrying capacity, while still improving the frictional properties of the bearing material.

Accordingly, the inventors of the present invention have advantageously provided a bearing material which has both a high wear resistance and a high fatigue resistance, despite the increased metallic particulate content typically associated with a decrease in wear resistance of bearing material.

As used herein, with reference to the present invention, relative amounts of components in the bearing material are given in weight percentages (wt %). This refers to the dry weight percentages of each component. The skilled person would understand that this is the proportion of each component, given by weight, of the final bearing material following any curing steps and once any solvent has been removed.

The metallic particulate may comprise any metal. For example, the metallic particulate may comprise at least one of aluminium, aluminium alloys, copper, copper alloys, silver, tungsten, tin, and stainless steel. The inventors of the present invention have identified that aluminium particulate provides the greatest improvement in fatigue resistance.

The metallic particulate may be any metallic particulate but preferably comprises metal flakes. The flake-like nature of the particulate generally results in the maximum area of metallic particulate being exposed to a co-operating shaft journal by virtue of the plane of the flakes orientating generally parallel to the bearing surface. The provision of flakes within the polymer-based overlay layer that are generally parallel to the bearing surface may be provided by spray deposition of the polymer-based overlay layer.

A further advantage of the platelet flake morphology of the metallic particulate is that the flakes are more securely bonded to the polymer-based matrix by virtue of the relatively large surface area of each individual flake, and thus resists metal flakes becoming plucked from the polymer-based matrix during engine operation.

Preferably, the metallic particulate comprises aluminium flakes.

Preferably, the metallic particulate have a D50 size of between about 5 μm and about 30 μm along the maximal dimension. More preferably, a D50 size of between about 10

μm and about 20 μm along the maximal dimension. This has been found to provide a particularly suitable form of metallic particulate addition. D50 is the median diameter of the particle size distribution of the metallic particulate.

The metal oxide particulate may comprise any metal oxide. Preferably, the metal oxide particulate comprises one or more of cerium oxide, tin oxide, titanium dioxide, and zirconium dioxide. Preferably, the metal oxide may be one or more of $CeO_2$, $SnO$, $SnO_2$, $TiO_2$, or $ZrO_2$.

In a particularly preferred embodiment, the metal oxide comprises cerium oxide or $CeO_2$.

The use of cerium oxide, or $CeO_2$, in the overlay may allow a user to monitor overlay wear by measurement of the cerium accumulating in the oil of an engine. Unlike iron or other metals, cerium oxide is unlikely to be used elsewhere in the engine system. Therefore, cerium in the oil could only originate from wear of the overlay. The presence of cerium oxide in the overlay may therefore advantageously be used to gauge bearing wear without the need for visual checks and an engine rebuild. Cerium oxide has also been found to be particularly effective at increasing the abrasive wear resistance of the bearing material.

The use of cerium oxide in the overlay may provide the further advantage of improving the wettability of the sliding component with respect to lubricating oils, due to the high surface energy of the cerium oxide particles. In addition, the catalytic properties of $CeO_2$ may help to prevent soot depositions or other carbon based build-up in an internal combustion engine.

The inventors have found that metal oxides with a Mohs hardness greater than about 8 are undesirably abrasive for use in an overlay for sliding applications. The presence of these oxides in an overlay may lead to increased wear of the sliding component or a cooperating component. Particles with Mohs hardness greater than about 8 may also disadvantageously form initiation points for fatigue cracks in the overlay, reducing the fatigue resistance of the overlay. Metal oxides with a Mohs hardness lower than about 3, or 4, or 4.5, on the other hand, may be insufficiently hard to produce the desired wear reduction in the overlay, depending on the load applied to the overlay during use. The inventors have found that metal oxides with Mohs hardness between about 5 and about 7 provide the best wear reduction. Cerium oxide has a Mohs hardness of about 6 which provides optimal wear resistance.

Use of metal oxides having thermal conductivity greater than 1.5 $Wm^{-1}K^{-1}$ may advantageously increase the thermal conductivity of the overlay. In high speed applications involving high temperatures, this may allow the overlay to dissipate heat away from its surface as quickly as possible so as to reduce the likelihood of seizure due to overheating. This may provide an advantage over prior art overlays, particularly those comprising iron oxide, $Fe_2O_3$, which has a low thermal conductivity of only 0.37 $Wm^{-1}K^{-1}$. Cerium oxide has a thermal conductivity of about 12 $Wm^{-1}K^{-1}$ which provides good head dissipation and seizure resistance.

The bearing material may comprise any amount of melamine cyanurate particulate. Preferably, the bearing material comprises at least about 1 wt %, at least about 5 wt %, or at least about 8 wt % melamine cyanurate particulate.

The bearing material may comprise no more than about 20 wt %, no more than about 15 wt %, or no more than about 10 wt % melamine cyanurate particulate.

The bearing material may comprise between about 1 wt % and about 20 wt %, preferably between about 5 wt % and about 15 wt %, particularly preferably between about 8 wt % and about 10 wt % melamine cyanurate particulate.

The bearing material may comprise between about 5 wt % and about 12 wt % melamine cyanurate particulate.

Within this range, the incorporation of melamine cyanurate may advantageously improve the frictional properties of the bearing material. Particularly advantageously, this quantity of melamine cyanurate may produce a bearing material with acceptable wear resistance characteristics.

In preferred embodiments, the bearing material comprises between about 8 wt % and about 9 wt % melamine cyanurate. In particularly preferred embodiments, the bearing material comprises about 9 wt % melamine cyanurate particulate.

The bearing material may comprise any amount of metal oxide particulate. Preferably, the bearing material comprises at least about 1 wt %, at least about 3 wt %, or at least about 5 wt % metal oxide particulate.

The bearing material may comprise no more than about 20 wt %, no more than about 10 wt %, or no more than about 8 wt % metal oxide particulate.

The bearing material may comprise between about 1 wt % and about 20 wt %, preferably between about 3 wt % and about 10 wt %, particularly preferably between about 5 wt % and about 8 wt % metal oxide particulate.

The bearing material may comprise between about 3 wt % and about 9 wt % metal oxide particulate.

The inventors have found the wear reduction provided by the metal oxide particulate decreases substantially when less than about 1 wt % metal oxide particulate is provided while between 1 wt % and about 20 wt % metal oxide particulate content provides substantial wear reduction without compromising the fatigue resistance of the sliding component. More than 20 wt % may disadvantageously reduce the integrity of the polymer matrix and so reduce its strength.

In preferred embodiments, the bearing material comprises between about 6 wt % and about 7 wt % metal oxide particulate. In particularly preferred embodiments, the bearing material comprises about 6 wt % metal oxide particulate.

The bearing material may comprise any amount of metallic particulate. Preferably, the bearing material comprises at least about 15 wt %, at least about 30 wt %, or at least about 32 wt % metallic particulate.

The bearing material may comprise no more than about 50 wt %, no more than about 45 wt %, or no more than about 40 wt % metallic particulate.

The bearing material may comprise between about 15 wt % and about 50 wt %, preferably between about 30 wt % and about 45 wt %, particularly preferably between about 32 wt % and about 40 wt % metallic particulate.

The bearing material may comprise between about 29 wt % and about 38 wt % metallic particulate.

The inventors have found that the provision of less than about 15 wt % metallic particulate does not have a significant enhancing effect on the fatigue and seizure resistance of the overlay layer. It was also found that providing more than about 50 wt % metallic particulate may have an unacceptable and detrimental effect on the wear resistance of the bearing material despite the inclusion of melamine cyanurate particulate. Additionally, providing more than about 50 wt % metallic particulate may compromise the structural integrity of the polymer matrix.

In preferred embodiments, the bearing material comprises between about 34 wt % and about 36 wt % metallic particulate. In particularly preferred embodiments, the bearing material comprises about 35 wt % metallic particulate.

In addition to the components set out above, the bearing material may comprise one or more additional components.

For example, the bearing material may comprise at least one of a dispersant, an adhesion agent, and a leveler.

The provision of a dispersant may advantageously ensure that the particulate content of the bearing material is evenly dispersed throughout the polymer matrix. This advantageously ensures that the bearing material has homogeneous and predictable properties.

The bearing material may comprise any amount of dispersant. For example, the bearing material may comprise at least about 0.5 wt %, at least about 1 wt %, or at least about 1.5 wt % dispersant. The bearing material may comprise no more than about 10 wt %, no more than about 5 wt %, or no more than about 3 wt % dispersant.

The bearing material may comprise between about 0.5 wt % and about 10 wt %, about 1 wt % and about 5 wt %, and about 1.5 wt % and about 3 wt % dispersant. In particularly preferred embodiments, the bearing material comprises about 2 wt % dispersant.

The provision of an adhesion agent may advantageously enhance adhesion between the polymer matrix and the substrate onto which the bearing material is applied. Suitable adhesion agents include silane material. A suitable silane material may be gamma-aminopropyltriethoxysilane (e.g. 3-aminopropyltriethoxysilane). A suitable alternative silane material may comprise bis-(gamma-trimethoxysilpropyl)amine. In addition to promoting adhesion, silane materials may promote stability of the polymer matrix of polyamide-imide polymer material.

The bearing material may comprise any amount of adhesion agent. For example, the bearing material may comprise at least about 1 wt %, at least about 2.5 wt %, or at least about 4 wt % adhesion agent. The bearing material may comprise no more than about 15 wt %, no more than about 10 wt %, or no more than about 6 wt % adhesion agent.

The bearing material may comprise between about 1 wt % and about 15 wt %, about 2.5 wt % and about 10 wt %, and about 4 wt % and about 6 wt % adhesion agent. In particularly preferred embodiments, the bearing material comprises about 5 wt % adhesion agent.

The leveler may act as a surface coating additive to improve wetting of the polymer matrix on a substrate, for example a metal substrate, when the polymer matrix is applied to the substrate. Improved wetting advantageously results in a bearing material having a more even thickness.

The bearing material may comprise any amount of leveler. For example, the bearing material may comprise at least about 0.01 wt %, at least about 0.02 wt %, or at least about 0.04 wt % leveler. The bearing material may comprise no more than about 0.1 wt %, no more than about 0.08 wt %, or no more than about 0.06 wt % leveler.

The bearing material may comprise between about 0.01 wt % and about 0.1 wt %, about 0.02 wt % and about 0.08 wt %, and about 0.04 wt % and about 0.06 wt % leveler. In particularly preferred embodiments, the bearing material comprises about 0.05 wt % leveler.

The bearing material may comprise between about 0.5 wt % and about 5 wt % leveler and dispersant combined.

The balance of the bearing material may comprise the polyamide-imide polymer material.

The metal oxide particulate may have an average particle size (or D50) of between about 0.1 µm and about 10 µm. Particularly preferably, the overlay comprises metal oxide particles having an average particle size (or D50) of at least about 0.5 µm, at least about 1 µm, or at least about 1.5 µm, and/or no more than about 3 µm, no more than about 2 µm, 4 µm, or no more than about 5 µm or 6 µm.

The metal oxide particulate may have an average particle size of between about 0.1 µm and about 2.0 µm.

The inventors have found that spherical metal oxide particles are particularly preferred because they may be more effective than other particle shapes at introducing less stress into the polymer matrix during use, thus avoiding introducing initiation points for fatigue cracking of the polymer matrix.

The overlay may alternatively comprise metal oxide in non-spherical form, such as in laminar or plate form, or flaked form.

In some particularly preferred embodiments, the metal oxide particulate comprises cerium oxide, and the metallic particulate comprises aluminium flakes, and the bearing material comprises between about 8 wt % and about 10 wt % melamine cyanurate particulate, between about 5 wt % and about 8 wt % metal oxide particulate, and between about 30 wt % and about 40 wt % metallic particulate.

According to a second aspect of the invention, there is provided a bearing element comprising a substrate and an overlay layer on the substrate. The overlay layer comprises the bearing material of the first aspect of the invention.

Particularly advantageous applications for the bearing elements are as sliding bearings in combustion engines, for example crankshaft and/or camshaft supporting bearings, big end bearings and small end bushings. Bearing elements embodying the invention are particularly suitable for use in vehicle engines, including those equipped with stop-start engine technology in which the engine is subjected to a substantially greater number of starts over the life of the engine than in conventional engines and in which the crankshaft is regularly accelerated from rest before a uniform hydrodynamic film of lubricant is established on the bearing/running surface. Furthermore, bearing elements embodying the invention are particularly suitable for use in diesel engine, in particular 1.5 litre and 1.6 litre inline-four diesel engines which may be particularly susceptible to wear.

Bearing elements embodying the invention may also be used to form any of a number of sliding surfaces on engine components including bushes, piston skirts, piston rings, liners, camshafts and conrods. They may also be used as, or as part of any of thrust washers, flanges and half liners. Other suitable applications are envisaged and will be readily apparent to the skilled person.

The substrate may comprise any suitable material. Preferably, the substrate comprises a strong metal to give the bearing element greater structural rigidity. Suitable metallic substrate materials include: steel, aluminium, bronze, brass, bismuth, copper, nickel, tin, zinc, silver, gold and iron, or alloys of such materials. The substrate may comprise a combination of two or more such materials or alloys.

Particularly suitable substrate materials for bearing elements embodying the present invention include steel, iron, aluminium, copper alloy, bronze, and brass alloys.

The overlay layer comprising the bearing material may have any thickness. For example, the overlay layer may have a thickness of at least about 1 µm, at least about 3 µm, or at least about 5 µm, or at least about 10 µm. The overlay layer may have a thickness of no more than about 20 µm, no more than about 18 µm, no more than about 15 µm, or no more than about 14 µm. The overlay layer may have a thickness of between about 1 µm and about 20 µm, about 3 µm and about 18 µm, about 5 µm and about 15 µm, or about 10 µm and about 14 µm. In some particularly preferred embodiments, the overlay layer has a thickness of between about 8 µm and about 14 µm, preferably between about 12 µm and about 14 µm.

In some embodiments, the bearing material is provided as an overlay layer directly on the surface of the substrate. Where this is the case, there are no intermediate layers between the substrate and the bearing material.

Is some embodiments, the bearing element further comprises an intermediate layer between the substrate and the overlay layer. The intermediate layer, or lining layer, may advantageously provide an improved surface for adhesion of the bearing material when certain metallic substrate materials are used.

The intermediate layer may have a thickness of from about 0.1 mm to about 0.5 mm.

The intermediate layer may comprise any suitable material. For example, the intermediate layer may comprise at least one of aluminium, tin, nickel, silver, copper and/or iron or alloys comprising one or more of such materials. The intermediate layer may comprise a combination of two or more of such materials/alloys. The intermediate layer may also include an adhesion promoter and/or be subjected to a pre-treatment, for example a phosphating, chromating or silicating treatment.

In preferred embodiments, the intermediate layer comprises aluminium-based material (e.g. aluminium-tin alloy) or a copper-based material (e.g. copper-tin bronze). Preferably, the intermediate layer comprises bronze.

According to a third aspect of the present invention, there is provided a method of forming an overlay layer of bearing material on a substrate, the method comprising steps of mixing polyamide-imide polymer material with melamine cyanurate particulate, metal oxide particulate, metallic particulate, and at least one solvent to form a pre-formulation, applying the pre-formulation to a substrate, and curing the pre-formulation to form an overlay layer of bearing material. The overlay layer of bearing material comprises at least about 25 wt % metallic particulate.

The solvent is included to facilitate the formation of a mixture which can be applied to the substrate. Suitable solvents may be non-polar (e.g. xylene, toluene), polar aprotic (e.g. acetone, n-ethyl-2-pyrrolidone {NEP}, n-methyl-2-pyrrolidone {NMP}, gamma-butyrolactone, dipropylene glycol dimethyl ether) or polar protic (e.g. water, alcohol, glycol). The solvent can be employed in various proportions in order to achieve a particular desired viscosity of mixture for applying to the substrate. In some preferred embodiments, the solvent comprises at least one of n-butyl acetate and n-ethyl pyrrolidone. In some particularly preferred embodiments, the solvent comprises a combination of both n-butyl acetate and n-ethyl pyrrolidone. The n-butyl acetate and n-ethyl pyrrolidone may be added to the pre-formulation in any quantities. Preferably, the n-butyl acetate and n-ethyl pyrrolidone are added in a ratio of about 1:20, preferably about 45:1000 by mass.

The method may further comprise adding at least one of a dispersant, an adhesion agent, and a leveler to the pre-formulation.

The method may further comprise a step of pre-milling the melamine cyanurate particulate before adding it to the pre-formulation. This may advantageously deagglomerate the raw material and allow for improved dispersion of the melamine cyanurate particulate in the polymer matrix.

The method may further comprise a step of dispersing the metal oxide particulate in the pre-formulation using a high-shear mixer. This may advantageously improve the dispersion of the metal oxide particulate in the pre-formulation and the resulting bearing material.

The step of applying the pre-formulation to the substrate may involve applying the pre-formulation directly to the surface of the substrate. Where this is the case, there are no intermediate layers between the substrate and the bearing material.

Alternatively, the step of applying the pre-formulation to the substrate may involve applying the pre-formulation to an intermediate layer. The intermediate layer may be an intermediate layer as described above. For example, the intermediate layer may comprise an aluminium-based material or a copper-based material.

Where the method comprises applying the pre-formulation to an intermediate layer, the method may further comprise a step of modifying the surface of the intermediate layer before the pre-formulating is applied. For example, the method may comprise a step of grit blasting the intermediate layer. This may roughen the surface of the intermediate layer and may advantageously improve the adhesion of the pre-formulation to the intermediate layer.

The method may further comprise a drying step once the pre-formulation has been applied to the substrate. The drying step may be used to remove any solvent from the pre-formulation. The drying step may take place before the curing step. Alternatively, there may be a combined drying and curing step.

The step of curing the pre-formulation to form an overlay layer of bearing material may comprise a thermal or a non-thermal process. Where the curing process is a thermal process, the curing process may be provided by baking the substrate with the deposited pre-formulation in an oven or irradiating the substrate with infrared radiation. Where the curing process is a non-thermal process, the curing process may be provided by exposing the deposited pre-formulation to ultraviolet light.

Where the curing process is a thermal process, the time and temperature of the thermal curing step may be selected to achieve the desired level of polymer cross-linking of the polyamide-imide polymer material in the cured bearing material. Any degree of polymer cross-linking may be achieved by varying the parameters of the curing process. The degree of cross-linking of the polyamide-imide polymer material in the bearing material of the present invention may be less or lower than the degree of polymer cross-linking of polyamide-imide polymer materials in some bearing materials known in the art. It has surprisingly been found that the thermal curing parameters of the present invention lead to a degree of polymer cross-linking which provides advantageous properties in the behaviour of the polymer material. For example, it was found that the degree of polymer cross-linking in the polyamide-imide polymer material advantageously improved the fatigue resistance of the bearing material of embodiments of the present invention.

Where the curing process is a thermal process, preferably the curing temperature is between 155 degrees Celsius and 170 degrees Celsius.

The method may further comprise applying a further amount of pre-formulation on top of the first amount of pre-formulation. In this way, the overlay layer of bearing material may be built up with multiple layers of pre-formulation. Preferably, the pre-formulation is dried between each application of pre-formulation. In this embodiment, the method may include alternating steps of applying the pre-formulation and drying. The method may comprise a curing step between each application of pre-formulation. In this embodiment, the method may include alternating steps of applying the pre-formulation and curing. Alternatively, the method may comprise a single curing step once the desired number of layers of pre-formulation have been applied.

The provision of applying the pre-formulation in a plurality of discrete layers advantageously reduces the drying time since the solvent will be more readily removed from a thin layer rather than a thick layer of pre-formulation. Furthermore, it may advantageously allow for greater control of the thickness of the finished bearing material.

The step of applying the pre-formulation to the substrate may comprise at least one of spraying, and screen printing. Alternatively, or in addition, the step of applying the pre-formulation to the substrate may comprise at least one of ink-jet printing, spin coating, or transfer coating using a brush or roller.

It should be appreciated that any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE DRAWINGS

The invention will further be described by way of example only with reference to the accompanying drawing, in which.

DETAILED DESCRIPTION

Figure 1:
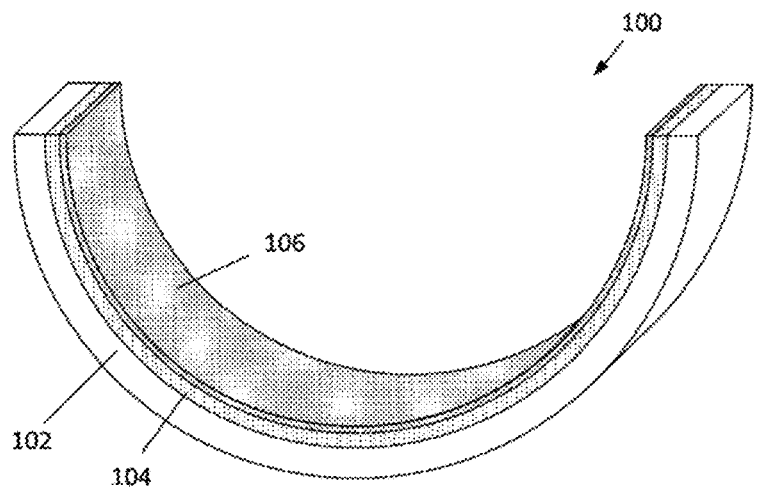
FIG. 1 shows a perspective view of a bearing element according to preferred embodiments of the present invention.

FIG. 1 schematically illustrates a bearing element, the bearing element is a semi-cylindrical bearing shell 100, which is also commonly referred to as a half bearing or a half shell, for a main bearing assembly of an internal combustion engine for retaining a cylindrical journal of a crankshaft.

The bearing shell 100 has a layered construction incorporating a substrate comprising a steel substrate 102 and intermediate or lining layer 104 comprising a layer of copper-tin bronze material. An overlay 106 of a bearing material is disposed on top of the intermediate layer 104.

Overlay layer 106 is formed from a bearing material comprising a polymer matrix of polyamide-imide polymer material with melamine cyanurate particulate, metal oxide particulate, and metallic particulate dispersed within the polymeric matrix.

The bearing material comprises about 9 wt % melamine cyanurate particulate.

The melamine cyanurate particulate has an average particle size of between about 2 μm and about 5 μm.

The metal oxide is cerium oxide and the bearing material comprises about 6 wt % cerium oxide particulate. The cerium oxide particulate has an average particle size of about 1 μm.

The metallic particulate comprises aluminium flakes, and the bearing material comprises about 35 wt % aluminium flakes. The aluminium flakes have a length of less than 10 μm in a longest dimension and less than 1 μm in a dimension perpendicular to a longest dimension.

The melamine cyanurate particulate, metal oxide particulate, and metallic particulate are distributed substantially homogeneously throughout the polymer matrix.

The bearing material also comprises a dispersant and a leveler, the relative quantities of which are set out below.

An adhesion agent is also added to the pre-formulation shortly before the pre-formulation is applied to the intermediate layer.

The overlay layer comprising the bearing material has a thickness of about 10 μm.

The bearing element shown in FIG. 1 is formed by the following method.

Polyamide-imide polymer material is mixed with melamine cyanurate particulate, cerium oxide particulate, aluminium flakes, a dispersant, and a leveler. A solvent is added to the mixture to form a pre-formulation which is capable of being applied to a substrate. The solvent comprises a mixture of n-butyl acetate and n-ethyl pyrrolidone.

The relative quantities, given in weight percentages, of the components of the finished bearing material, following the drying and curing steps, are set out below in Table 1.

TABLE 1

| Component | wt % in Bearing Material |
| --- | --- |
| Polyamide-imide | Balance |
| Aluminium flakes | 29 to 38 |
| Melamine cyanurate particulate | 5 to 12 |
| Cerium oxide particulate | 3 to 9 |
| Levellers and Dispersants | 0.5 to 5 |
| Adhesion agent | 3 to 6 |

The method further comprises providing a steel substrate 102 having an intermediate layer 104 provided on its surface. The pre-formulation is then applied to the intermediate layer using spraying. The applied pre-formulation is then dried to remove the solvent. The dried pre-formulation is then cured using a thermal curing process at a temperature and for a duration to achieve a desired degree of cross-linking of the polyamide-imide polymer matrix. The pre-formulation is cured to form an overlay layer of bearing material having the composition set out in Table 1.

The volume loss of material, measured in $mm^3$, is a measurement of overlay wear.

Two groups of bearing samples were tested under the same wear conditions, termed Group A and Group B.

Group A included six bearing samples according to the prior art and was used as a control group. Each bearing sample of Group A included a PAI-based overlay according to the prior art. The overlay on the bearings of Group A did not include between 29 wt % and 38 wt % aluminium flakes, or any melamine cyanurate particulate.

Group B included six bearing samples according to the present invention. Each bearing sample of Group B included an overlay having the composition set out in Table 1.

Figure 2:
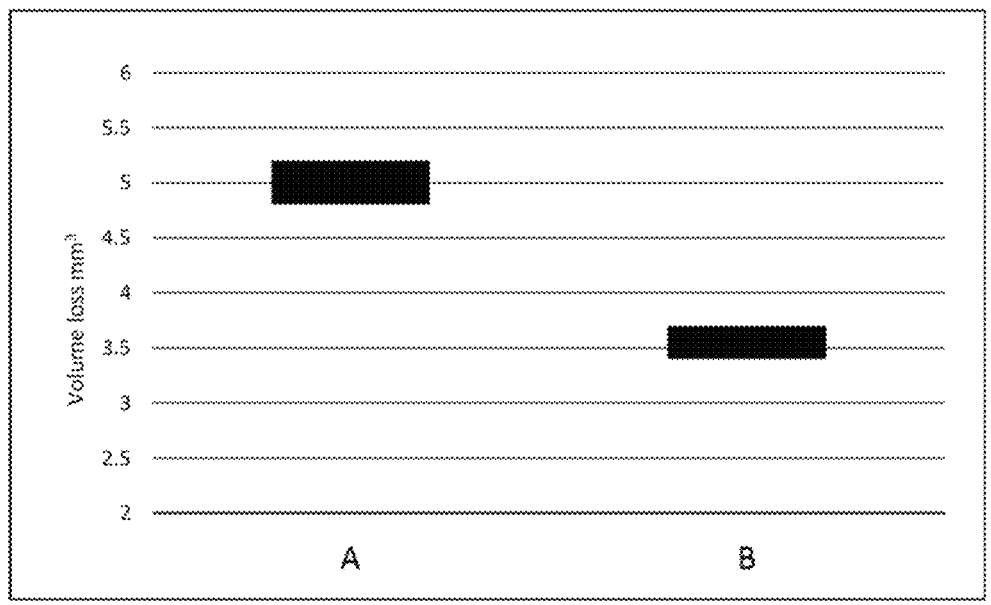
FIG. 2 is a graph showing volume loss of material (wear) in tests of two different overlays, including one overlay embodying the invention.

The spread of volume loss of the samples in Group A and Group B are shown in FIG. 2. The bearings of Group A exhibited a volume loss of between 4.8 $mm^3$ and 5.2 $mm^3$, whereas the bearings of Group B exhibited significantly less volume loss, between 3.4 $mm^3$ and 3.7 $mm^3$.

Accordingly, it was shown that bearings including a bearing material according to the present invention exhibit superior wear resistance compared to those of the prior art.

Although described herein and illustrated in the drawing in relation to a half bearing shell, the present invention may equally apply to other sliding engine components, including semi-annular, annular or circular thrust washers, and bushes, and engines comprising such sliding engine component.

The invention claimed is:

1. A bearing material, comprising:
   a polymer matrix of polyamide-imide polymer material;
   melamine cyanurate particulate;
   metal oxide particulate;
   greater than 25 wt % metallic particulate dispersed within the polymer matrix, the metallic particulate comprising metal flakes with a D50 size of between about 5 µm and about 30 µm along a maximal dimension; and
   a leveler in an amount of between 0.01 wt % and 0.1 wt %.

2. The bearing material according to claim 1, wherein the metallic particulate comprises aluminium flakes.

3. The bearing material according to claim 1, wherein the metal oxide particulate comprises one or more of cerium oxide, tin oxide, titanium dioxide, and zirconium dioxide.

4. The bearing material according to claim 1, including between approximately 5 wt % and 12 wt % melamine cyanurate particulate.

5. The bearing material according to claim 1, including between approximately 3 wt % and 9 wt % metal oxide particulate.

6. The bearing material according to claim 1, including between approximately 29 wt % and 38 wt % metallic particulate.

7. The bearing material according to claim 1, further comprising a dispersant in an amount of between 0.5 wt % and 10 wt %, and an adhesion agent in an amount of between 1 wt % and 15 wt %; and
   wherein the amount of leveler is between 0.04 wt % and 0.06 wt %.

8. The bearing material according to claim 1, wherein the metal oxide particulate has an average particle size of between approximately 0.1 µm and 2.0 µm.

9. A bearing element, comprising:
   a substrate; and
   an overlay layer on the substrate;
   wherein the overlay layer comprises a bearing material according to claim 1.

10. The bearing element according to claim 9, wherein the bearing material is provided as an overlay layer, and wherein the overlay layer includes a thickness of between approximately 3 µm and 18 µm.

11. The bearing element according to claim 9, further comprising an intermediate layer between the substrate and the overlay layer.

12. The bearing element according to claim 11, wherein the intermediate layer comprises at least one of a copper-based material, and an aluminium-based material.

13. The bearing element according to claim 9, wherein at least one of:
   the metallic particulate of the bearing material comprises aluminium flakes; and
   the metal oxide particulate of the bearing material comprises one or more of cerium oxide, tin oxide, titanium dioxide, and zirconium dioxide.

14. The bearing element according to claim 9, wherein the bearing material includes between approximately 5 wt % and 12 wt % melamine cyanurate particulate.

15. The bearing element according to claim 9, wherein the bearing material includes between approximately 3 wt % and 9 wt % metal oxide particulate.

16. The bearing element according to claim 9, wherein the bearing material includes between approximately 29 wt % and 38 wt % metallic particulate.

17. A method of forming an overlay layer of bearing material on a substrate, the method comprising:
   mixing polyamide-imide polymer material with melamine cyanurate particulate, metal oxide particulate, metallic particulate, and at least one solvent to form a pre-formulation;
   applying the pre-formulation to a substrate;
   curing the pre-formulation to form an overlay layer of bearing material;
   wherein the overlay layer of bearing material comprises greater than 25 wt % metallic particulate, the metallic particulate comprising metal flakes with a D50 size of between about 5 µm and about 30 µm along a maximal dimension; and
   wherein the mixing further includes a leveler in an amount of between 0.01 wt % and 0.1 wt %.

18. The method according to claim 17, wherein applying the pre-formulation to the substrate comprises at least one of spraying and screen printing.

* * * * *